(12) United States Patent
Fama et al.

(10) Patent No.: US 7,853,006 B1
(45) Date of Patent: *Dec. 14, 2010

(54) SYSTEMS AND METHODS FOR SCHEDULING CALL CENTER AGENTS USING QUALITY DATA AND CORRELATION-BASED DISCOVERY

(75) Inventors: Jason Fama, Foster City, CA (US); Michael Robert Bourke, Jr., San Francisco, CA (US); Edward Hamilton, San Jose, CA (US); Jeff Iannone, Alpharetta, GA (US); Illah Nourbakhsh, Pittsburgh, PA (US); Joseph Watson, Alpharetta, GA (US); Kevin Hegebarth, Alpharetta, GA (US)

(73) Assignee: Verint Americas Inc., Melville, NY (US)

( * ) Notice: Subject to any disclaimer, the term of this patent is extended or adjusted under 35 U.S.C. 154(b) by 1318 days.

This patent is subject to a terminal disclaimer.

(21) Appl. No.: 11/359,909

(22) Filed: Feb. 22, 2006

(51) Int. Cl.
*H04M 3/00* (2006.01)

(52) U.S. Cl. .............................. 379/265.06; 379/265.05; 379/707.1

(58) Field of Classification Search ............. 379/365.06
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner*—Curtis Kuntz
*Assistant Examiner*—Karen L Le

(57) ABSTRACT

Systems and methods for visualization of call center performance are provided. An exemplary method includes the steps of: obtaining quality performance of agents data that includes information on the quality of service and quality characteristics of the agent, obtaining call center operations data that includes information on statistics and details of a call center, correlating the quality performance of agents data and the call center operations data, identifying correlation-based discovery, and optimizing call center performance based on the correlation-based discovery.

18 Claims, 15 Drawing Sheets

U.S. PATENT DOCUMENTS

| | | |
|---|---|---|
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,330,326 B1 * | 12/2001 | Whitt .................... 379/265.13 |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0138560 A1 | 6/2005 | Lee et al. |

| | | | |
|---|---|---|---|
| 2006/0179064 A1 * | 8/2006 | Paz et al. | 707/10 |

FOREIGN PATENT DOCUMENTS

| EP | 0773687 A2 | 5/1997 |
|---|---|---|
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *Info World* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You on (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle. *Will The Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.

\* cited by examiner

US 7,853,006 B1

SYSTEMS AND METHODS FOR SCHEDULING CALL CENTER AGENTS USING QUALITY DATA AND CORRELATION-BASED DISCOVERY

TECHNICAL FIELD

The present invention is generally related to scheduling employees of a company and, more particularly, is related to systems and methods for scheduling call center agents.

BACKGROUND

Existing forecasting and scheduling solutions allow call center managers to forecast workload and schedule the right number of skilled agents at the right times to meet their service goals. However, existing solutions do not factor quality of performance in determining a schedule. Therefore, call center supervisors have had to use inefficient manual processes, including manual scheduling of agents, to ensure that customers receive the desired service quality.

In addition, call centers have access to data about the quality of calls that are serviced. This data is collected based on a sophisticated set of voice recordings, forms filled out by supervisors, and other means for automatically and semi-automatically evaluating how well a call/customer was serviced. This data is kept as call details (e.g., time of day/date, type of call, customer information, etc.) and as agent details (e.g., name of agent, skills, experience, etc.). In addition, call centers can also have access to details regarding the actual schedule of agent operations (e.g., days, dates that agents worked, including their work shifts and break times, agent skills) and the actual record of call statistics overall (e.g., call service levels achieved, queue sizes, abandonment rates—all for various times of days, days of weeks, specific dates, etc.).

SUMMARY OF THE INVENTION

Systems and methods for scheduling call center agents are provided. Briefly described, one embodiment of such a system, among others, comprises an agent computing device that is capable of obtaining quality scores of agents and transmitting the quality scores of agents over a network. The quality score is a measurement of quality that each agent provides to a call center. The system further includes a manager computing device that is capable of receiving the quality scores of agents over the network, receiving a scheduled interval, and receiving a quality goal for the scheduled interval. The quality goal is a desired measurement of quality that the agents collectively provide to the call center. The manager computing device is further capable of determining a quality goal score for the scheduled interval based on the received quality scores of agents, and determining a schedule for the agents based on the quality goal, the quality goal score, and the scheduled interval.

An embodiment of a method, among others, can be broadly summarized as comprising the steps of: obtaining quality scores of agents; defining a scheduled interval; defining a quality goal for the scheduled interval; determining a quality goal score for the scheduled interval based on the quality scores of the agents; and determining a schedule for the agents based on the quality goal, the quality goal score, and the scheduled interval.

Embodiments of the present invention can also be viewed as providing methods for optimizing call center performance. In this regard, one embodiment of such a method, among others, can be broadly summarized as comprising the steps of: obtaining quality performance of agents data that includes information on the quality of service and quality characteristics of the agent; obtaining call center operations data that includes information on statistics and details of a call center; correlating the quality performance of agents data and the call center operations data; identifying correlation-based discovery; and optimizing call center performance based on the correlation-based discovery.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Disclosed herein are systems and methods that involve the scheduling of call center agents. In particular, the scheduling of agents can be achieved using a quality goal for a scheduled interval. In some embodiments, a schedule can be generated using statistical correlation of historical data associated with a call center and the agents. In this regard, correlation-based discovery (or patterns) can be analyzed to help supervisors improve the quality of service provided by the agents. For example, the supervisors may be interested in how quality of service (poor versus good quality of service) may be correlated with other contact center statistics. These statistics can include agent skill group, schedule information (time of day, date, etc.), and queue load information, for example.

Exemplary systems are first discussed with reference to the figures. Although these systems are described in detail, they are provided for purposes of illustration only and various modifications are feasible. After the exemplary systems have been described, examples of display diagrams and operations of the systems are provided to explain the manner in which the scheduling of the call center agents and the correlation of historical data can be achieved.

Figure 1:
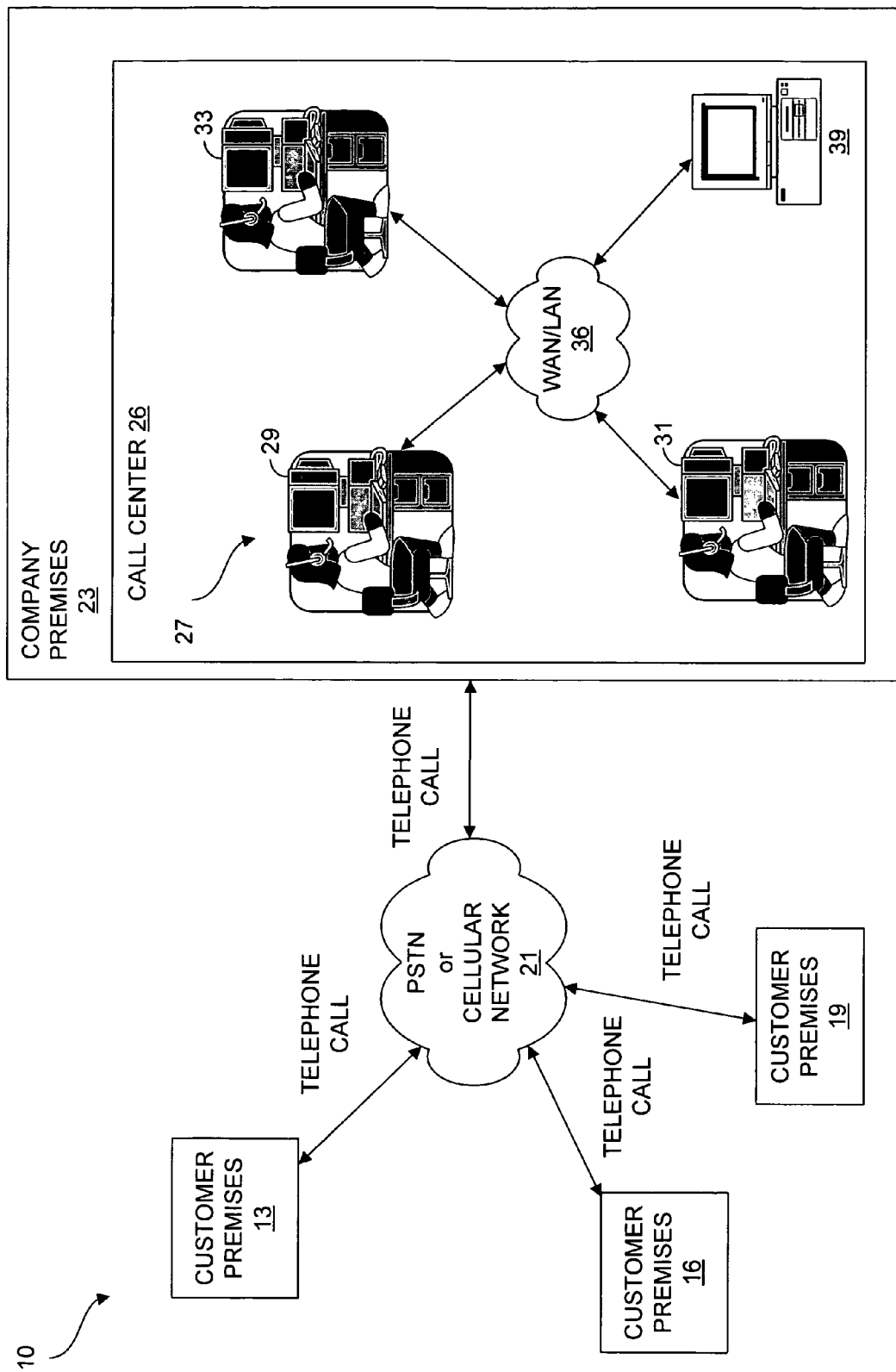
FIG. 1 is a schematic view of an embodiment of a system in which customers can communicate to call center agents of a company.

Referring now in more detail to the figures, FIG. 1 is a schematic view of an embodiment of a system in which customers can communicate to call center agents of a company. As indicated in this figure, the system 10 comprises one or more customer premises 13, 16, 19, a network 21 (e.g., PSTN and/or cellular), and a company premises 23, which includes a call center 26. Call center 26 includes an agent-manager system 27 having agent computing devices 29, 31 and 33 that communicate with a manager computing device 39 via a network 36 (e.g., local area network (LAN) or wide area network (WAN) or virtual private network (VPN)). The agent and manager computing devices 29, 31, 33, 39 can, for instance, comprise desktop computers (PCs) or Macintosh computers that can be connected to communication devices, such as headsets, microphones, and headphones, among others. The agent and manager computing devices are further described in relation to FIG. 2. The customer premises 13, 16, 19 include, for example, telephones, cellular phones, and any other communication devices that communicate to the call center 26 via the network 21.

Figure 2:
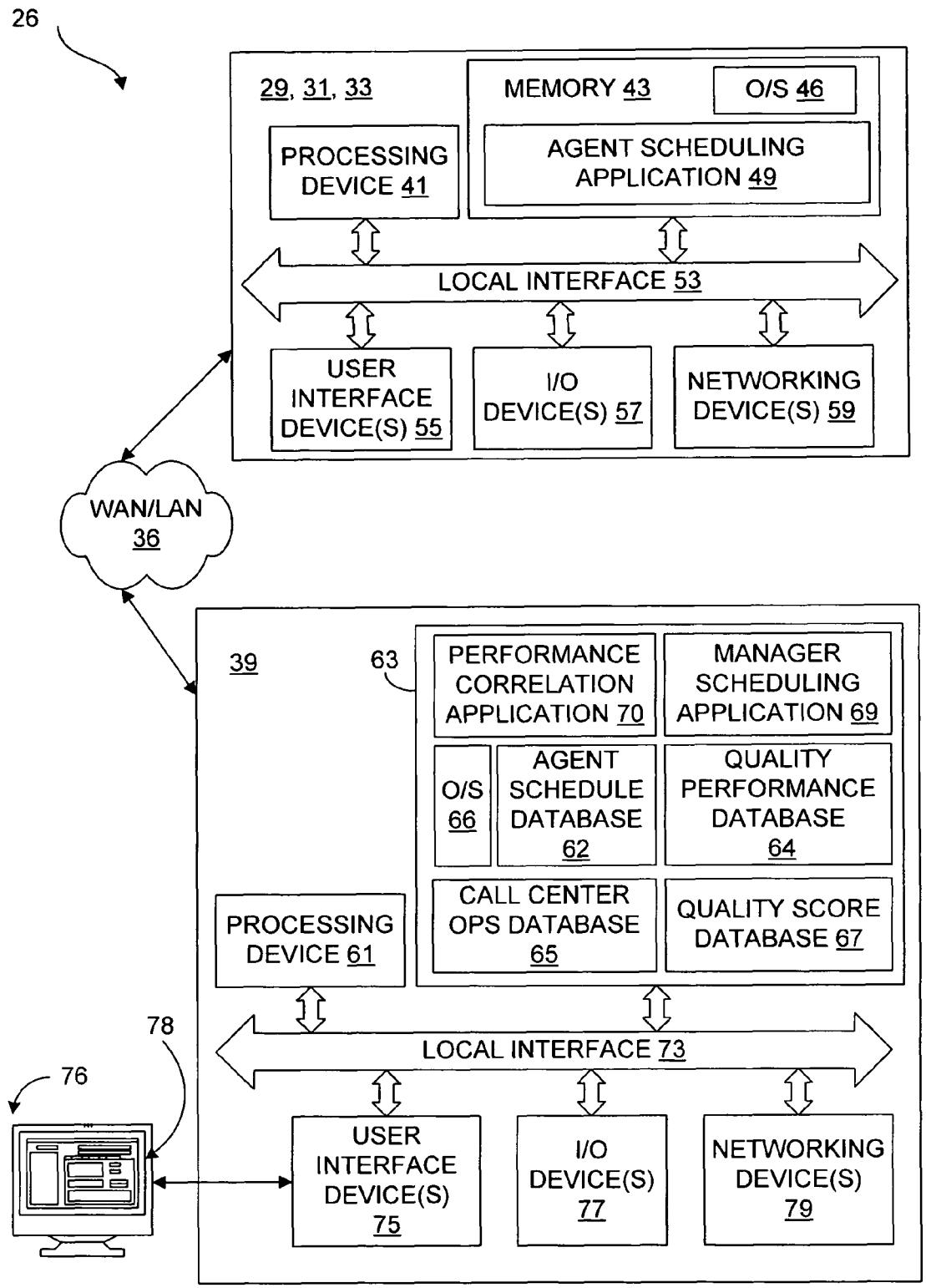
FIG. 2 is a block diagram of embodiments of agent and manager computing devices such as shown in FIG. 2.

FIG. 2 is a block diagram of embodiments of agent and manager computing devices such as shown in FIG. 1. As indicated in FIG. 2, each agent computing device 29, 31, 33 comprises a processing device 41, memory 43, one or more user interface devices 55, one or more input/output (I/O) devices 57, and one or more networking devices 59, each of which is connected to local interface 53. The processing device 41 can include any custom made or commercially available processor, a central processing unit (CPU) or an auxiliary processor among several processors associated with the agent computing device 29, 31, 33, a semiconductor base microprocessor (in the form of a microchip) or a macroprocessor. The memory 43 can include any one or a combination of volatile memory elements (e.g., random access memory RAM, such as DRAM, SRAM, etc.) and non-volatile memory elements (e.g., ROM, hard drive, tape, CD-ROM, etc.).

The one or more user interface devices 55 comprise elements with which the user (e.g, agent) can interact with the agent computing device 29, 31, 33. Where the agent computing device 29, 31, 33 comprises a personal computer (e.g., desktop or laptop computer) or similar device, these components can comprise those typically used in conjunction with a PC such as a keyboard and mouse.

The one or more I/O devices 57 comprise components used to facilitate connection of the agent computing device to other devices and therefore, for instance, comprise one or more serial, parallel, small computer system interface (SCSI), universal serial bus (USB), or IEEE 1394 (e.g., Firewire™) connection elements. The networking devices 59 comprise the various components used to transmit and/or receive data over the network 36, where provided. By way of example, the networking devices 59 include a device that can communicate both inputs and outputs, for instance, a modular/demodular (e.g., modem), a radio frequency (RF) or infrared (IR) transceiver, a telephonic interface, a bridge, and a router, as well as a network card, etc.

Memory 43 comprises various programs (in software and/or firmware), including an operating system (O/S) 46 and an agent scheduling application 49. The O/S 46 controls the execution of programs, including the agent scheduling application 49, and provides scheduling, input-output control, file and data management, memory management, communication control and related services. The agent scheduling application 49 facilitates the process for transmitting quality scores of agents. Typically, the process involves receiving evaluations corresponding to the agents and transmitting the evaluations via the network 36, and receiving the schedule of the agents based on configured quality goals and calculated correlation-based discovery. Operation of the agent scheduling application 49 is described in relation to FIGS. 8A-B and 11.

The architecture for the manager computing device 39 is similar to the architecture of the agent computing device 29, 31, 33 described above. That is, the manager computing device 39 includes a processing device 61, one or more user interface devices 75, one or more I/O devices 77, and one or more networking devices 79, each of which is connected to a local interface 73. The user interface device 75 is connected to a display device 76, which includes a display diagram 78. Examples of the display diagrams 78 are further described in FIGS. 3-7.

The memory 63 includes agent performance database 62, quality performance database 64, call center operations database 65, quality score database 67, manager scheduling application 69, and performance correlation application 70. Typically, the agent schedule database 62 includes, but is not limited to, information on shift details and shift-related information of the agents; the quality performance database 64 includes, but is not limited to, information on the quality of service and quality characteristics of the agent; the call center operation database 65 includes, but is not limited to, information on statistics and details of a call center; and the quality score database 67 includes, but is not limited to, the quality scores of the agents.

The performance correlation application 70 provides statistical correlation of historical data associated with a call center and the agents. Correlation-based discovery (or patterns) is then analyzed to help supervisors improve the quality of service provided by the agents. Operation of the performance correlation application 70 is described in relation to FIGS. 8A-B, 9, and 10. The manager scheduling application 69 provides a schedule for the call center agents based on configured quality goals, calculated quality scores of the agents, and calculated correlation-based discovery. Operation of the manager scheduling application 69 is described in relation to FIGS. 8A-B, 12A-B, and 13.

Figure 3:
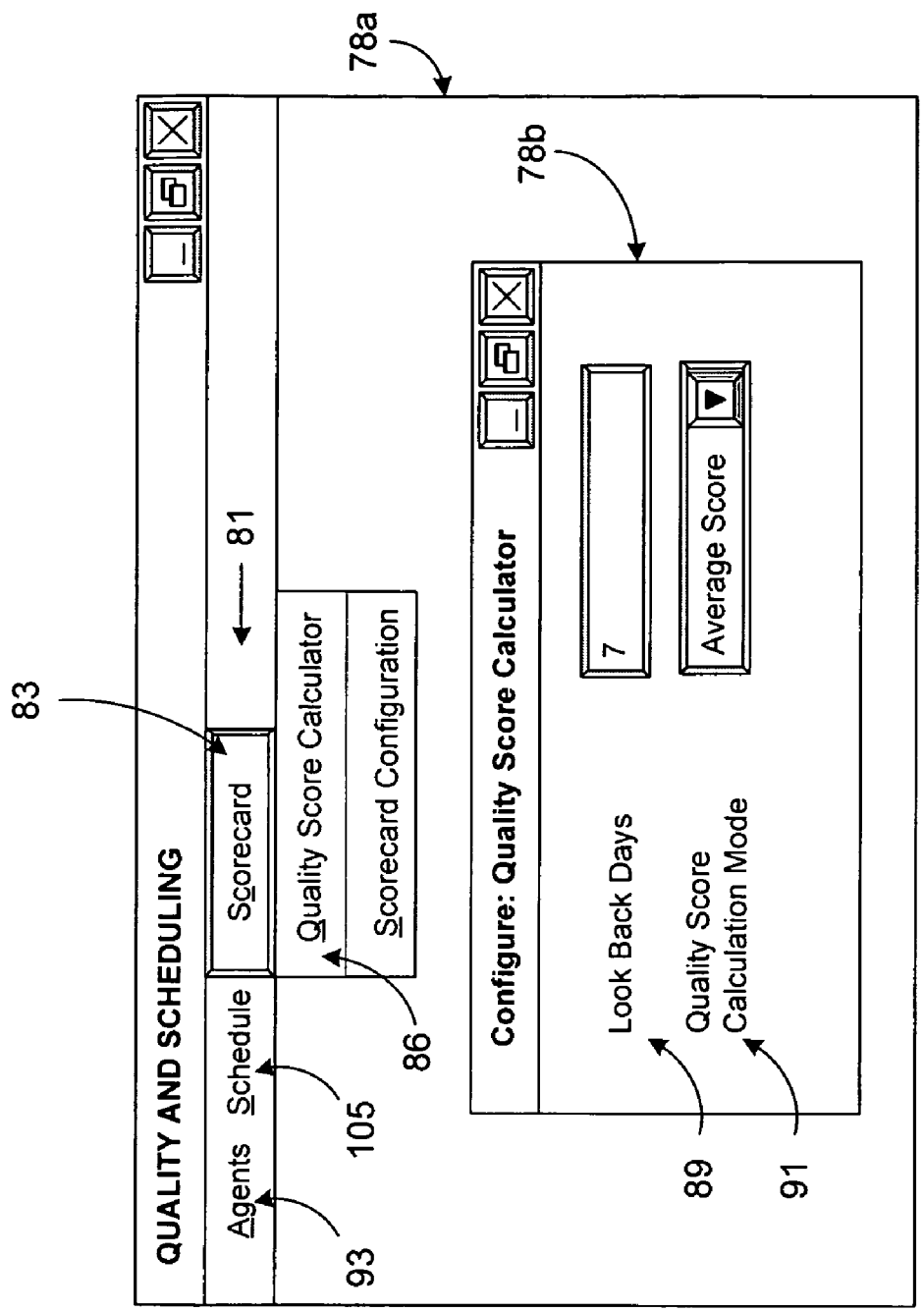
FIG. 3 is an exemplary display diagram from the display device of a manager computing device, such as shown in FIG. 2, that illustrates a graphical user interface for supervisors to calculate quality scores of agents.

FIG. 3 is an exemplary display diagram from the display device of a manager computing device, such as shown in FIG. 2, that illustrates a graphical user interface for supervisors to calculate quality scores of agents. By activating the manager scheduling application 69, a display diagram 78a entitled "Quality and Scheduling" is displayed on the display device 76. The diagram includes file menus 81 that include Agents 93, Schedule 105, and Scorecard 83. By selecting the file menu Scorecard 83, option "Quality Score Calculator" 86 appears.

By selecting option "Quality Score Calculator" 86, display diagram 78b entitled "Configure: Quality Score Calculator" is displayed. This diagram is used for configuring the calculation of quality scores of the agents. The Quality Score Calculator display diagram 78b includes a "Look Back Days" option 89 and "Quality Score Calculation Mode" option 91. The look back days option 89 enables the user to calculate quality scores of the agents in the past days, for example, for the past seven days. In other embodiments, the quality score can be calculated over past hours, weeks, a specific queue of the day, a specific day of the week, holidays, and events, for example.

In this example, each agent is evaluated on a daily basis based on evaluations and is given a quality score for each day. The quality score is stored in the quality score database 67 of the manager computing device 39. The agent could also be evaluated on different types of work or evaluated on one type of work performed in multiple intervals. Hence, an agent can receive a single quality score for one type of work or multiple quality scores for different types of work. For example, an agent might provide high quality when interacting during English language calls, but low quality when interacting during Spanish language calls.

The quality score calculation mode 91 enables the user to configure a mode of calculating the quality scores of the agents for the number of days entered in the "look back days" option 89. For example, the mode of calculation can be the average score of the agents during the previous 7-day interval. Other modes of calculation include, but are not limited to, medium score, lowest score, and highest score, for example.

Figure 4:
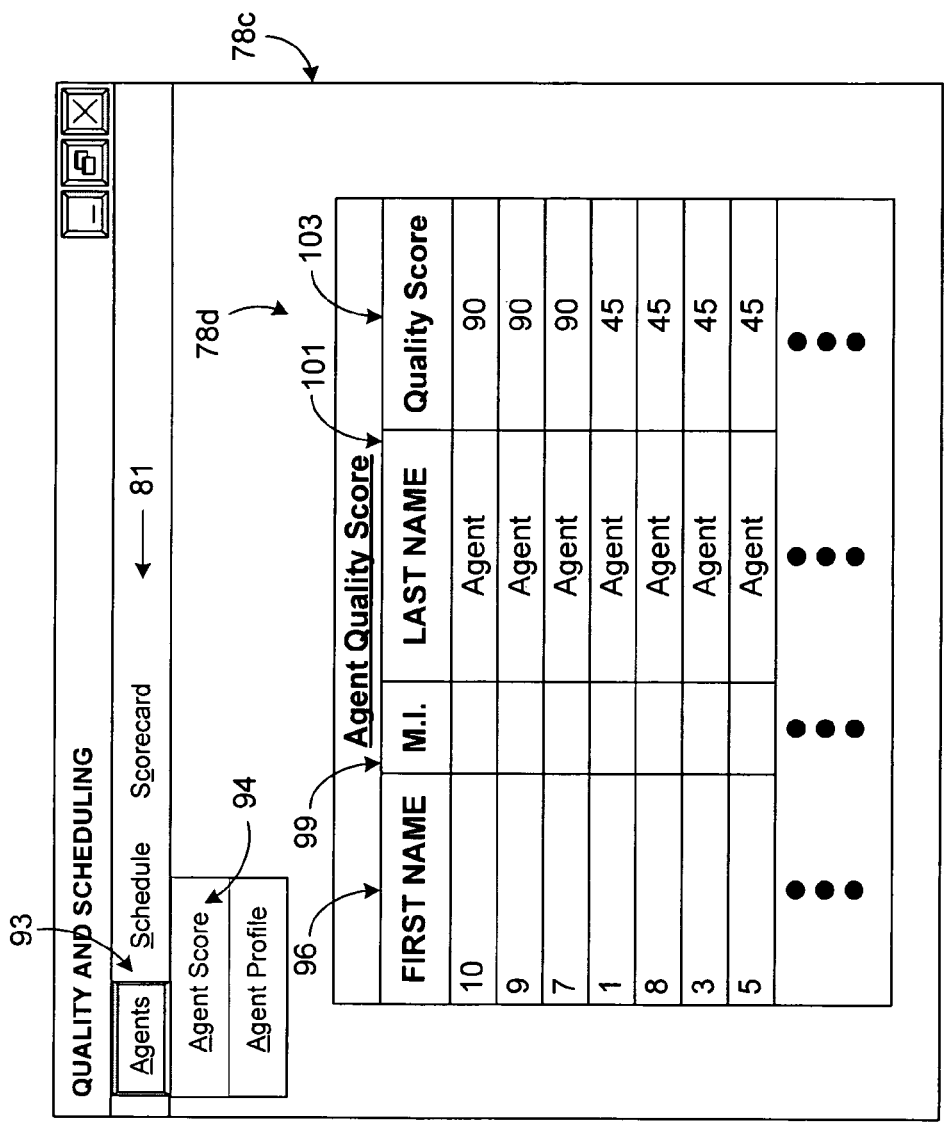
FIG. 4 is an exemplary display diagram from the display device of a manager computing device, such as shown in FIG. 2, that illustrates quality scoring of agents.

FIG. 4 is an exemplary display diagram from the display device of a manager computing device, such as shown in FIG. 2, that illustrates quality scoring of agents. By selecting agent score option 94 of the file menu Agents 93 on display diagram 78c, display diagram 78d appears. In particular, diagram 78d includes first name 96, middle initial 99, last name 101, and quality score 103.

Figure 5:
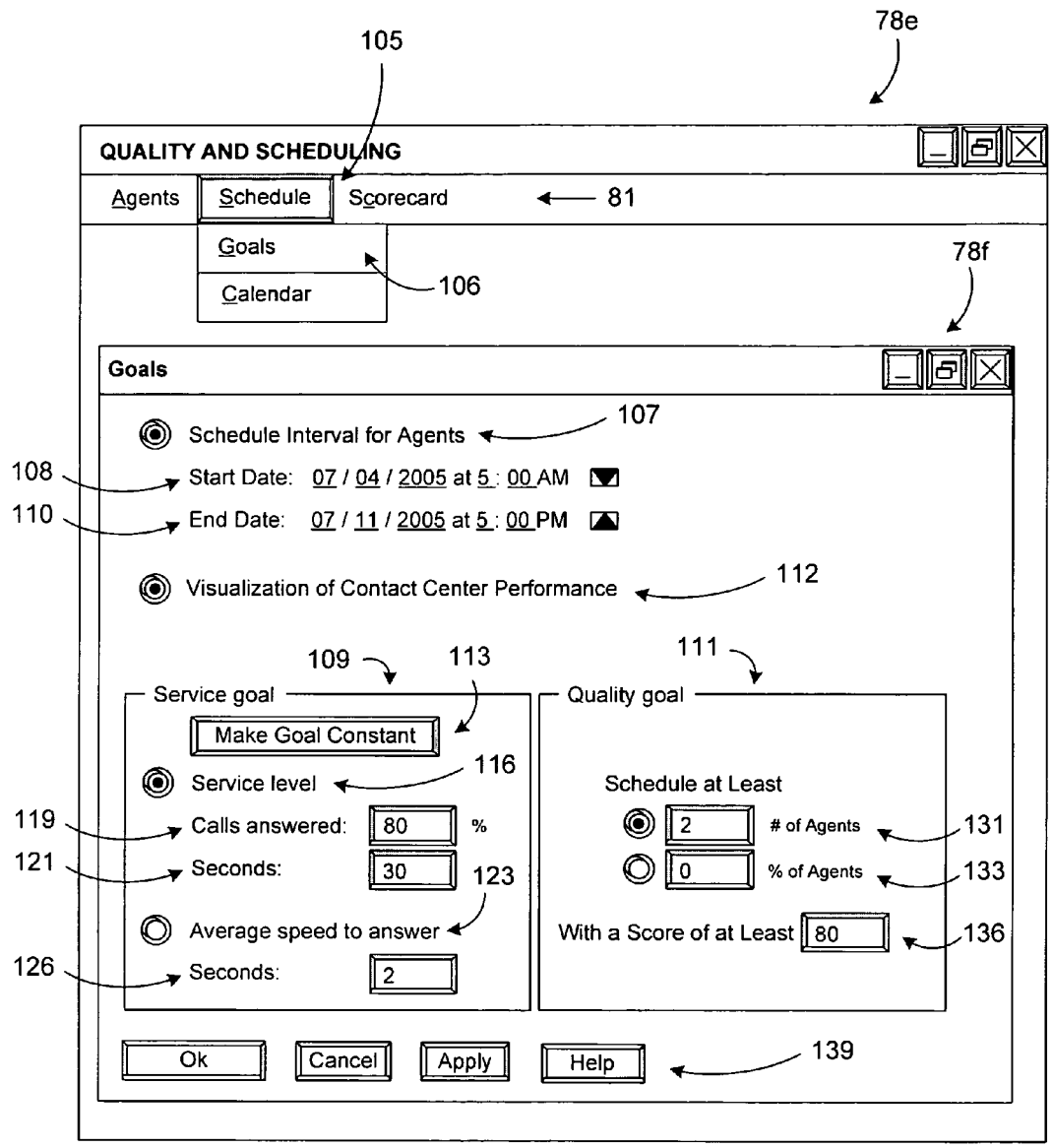
FIG. 5 is an exemplary display diagram from the display device of a manager computing device, such as shown in FIG. 2, that illustrates a graphical user interface for configuring parameters used in calculating a schedule.

FIG. 5 is an exemplary display diagram from the display device of a manager computing device, such as shown in FIG. 2, that illustrates a graphical user interface for configuring parameters used in calculating a schedule. By selecting goals option 106 of the file menu schedule 105 on display diagram 78e, display diagram 78f appears on the display device 76. The diagram 78f includes schedule option 107 for scheduling agents on specified intervals. The intervals include a start date 108 and end date 110, such as Jul. 4, 2005 at 5:00 am and Jul. 11, 2005 at 5:00 pm, respectively. A supervisor can select a "Visualization of Contact Center Performance" option 112 for identifying patterns that potentially indicate why and when certain poor performance occurs repeatedly. The patterns can be correlated with exogenous events such as high average handling time (AHT) or long queue times. The operation of the visualization of contact center performance is further described in relation to FIGS. 8A-B, 9, and 10.

In service goal section 109, a "Make Goal Constant" option 113 enables the supervisor to set the same goal for the specified intervals being scheduled. A service level option 116 enables the supervisor to configure a level of service that the agents should be providing during the specified intervals. For example, the supervisor can specify that the agents should answer 80% (option 119) of the incoming calls within 30 seconds (option 121) or that each agent should answer a call on average (option 123) within, for example, two seconds of an incoming call (option 126).

A quality goal section 111 enables a user to schedule, for example, 2 agents (option 131) or a percentage of the agents (option 133) having at least a quality score of 80 (option 136) during the past working 7-day period. As mentioned above, the quality score is calculated based on evaluations of performance given to each agent. In this example, the quality score indicates the quality of service that the agents have demonstrated during the past 7-day period. The display diagram 78f further includes action features 139 such as "Ok", "Cancel", "Apply", and "Help".

After the supervisor completes configuring the parameters used in calculating a schedule, the user can select the "Ok" button of the action features 139 to start calculating the schedule for the agents. The operation of scheduling agents based on quality data and correlation-base discovery is further described in relation to FIGS. 8A-B, 12A-B, and 13.

Figure 6:
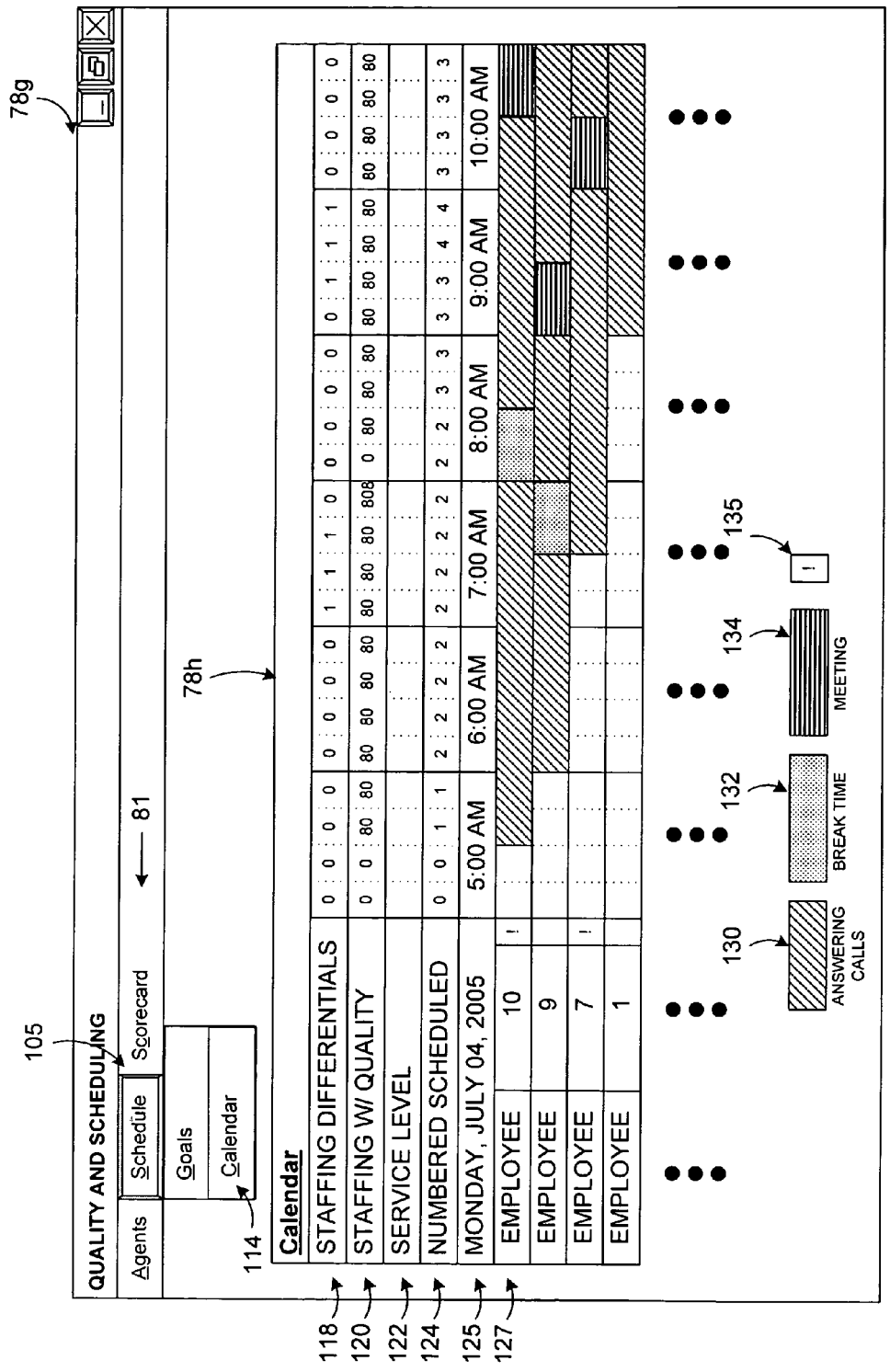
FIG. 6 is an exemplary display diagram from the display device of a manager computing device, such as shown in FIG. 2, that illustrates a Gantt chart having a calculated schedule.

FIG. 6 is an exemplary display diagram from the display device of a manager computing device, such as shown in FIG. 2, that illustrates a Gantt chart having a calculated schedule. The display diagram 78h can appear by selecting the "Ok" button 139 in FIG. 5 or by selecting calendar option 114 of the file menu schedule 105 on display diagram 78g in FIG. 6, for example. The Gantt chart 78h includes staffing differentials 118, staffing with quality 120, service level 122, number of agents scheduled 124, date and time 125, and list of employees 127.

The Gantt chart 78h provides various activities for each employee, which can be color coded. For example, employee 10 should come into work at 5:30 am and begin answering calls (130), get a break (132) from 8:00-8:30 am, answer calls (130) from 8:30-10:30 am, and should attend a manager meeting (134) from 10:30-11:00 am. There is no intention to limit the invention to this particular type of activity. Other types of activities may include training and installation of an application, for example. The staffing with quality section 120 provides a total number of agents staffed for a 15-minute interval who are meeting their quality goal. Exclamation marks 135 next to the employees 10 and 7 indicate that they have not met their quality goal. The supervisor can click on an exclamation mark for more information.

Figure 7:
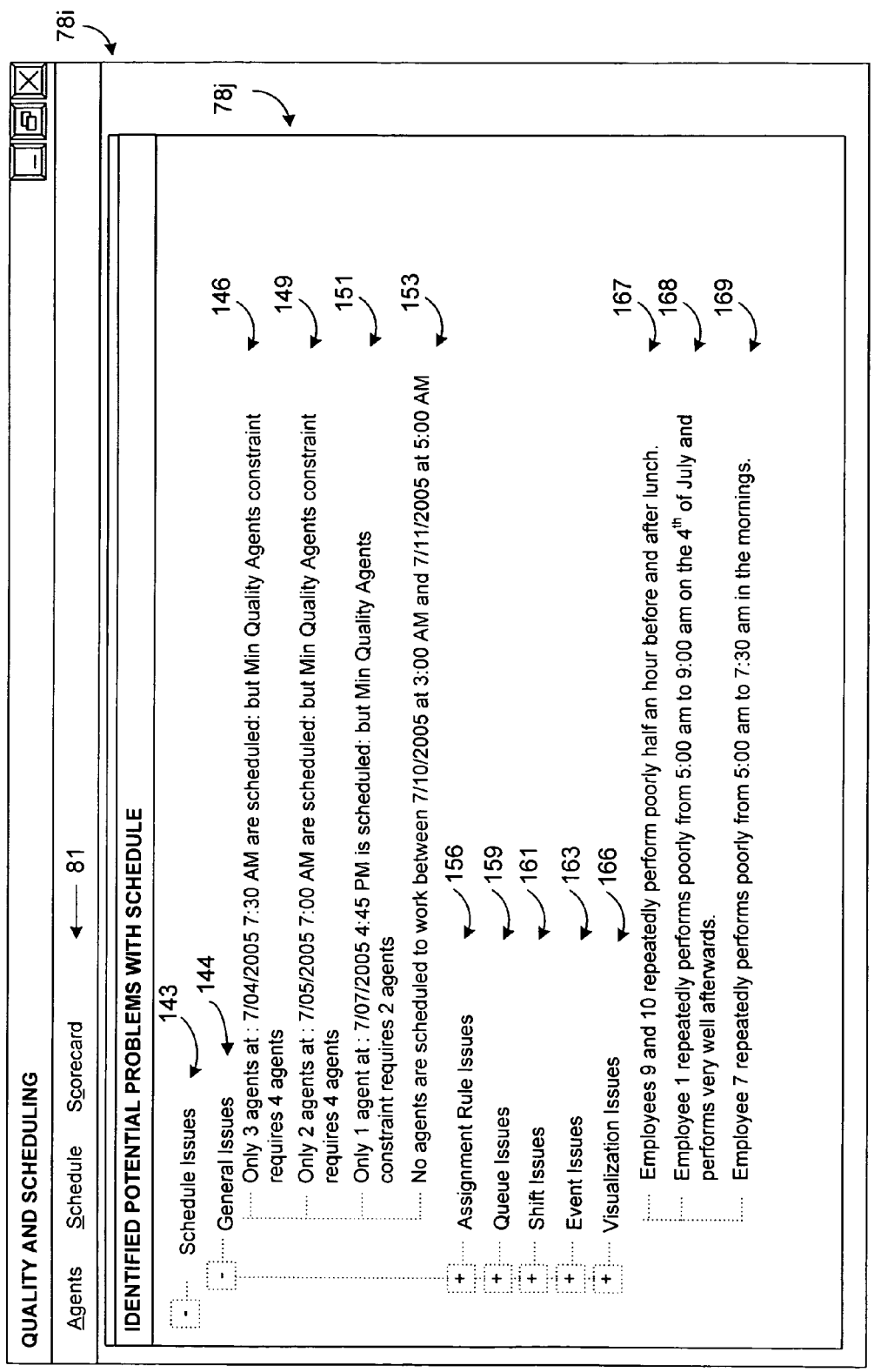
FIG. 7 is an exemplary display diagram from the display device of a manager computing device, such as shown in FIG. 2, that identifies potential problems of a calculated schedule, such as shown in FIG. 6.

FIG. 7 is an exemplary display diagram from the display device of a manager computing device, such as shown in FIG. 2, that identifies potential problems of the calculated schedule such as shown in FIG. 6. By selecting the "Ok" button 139 in FIG. 5 or selecting calendar option 114 of the file menu schedule 105 on display diagram 78g in FIG. 6, for example, the display diagram 78j within display diagram 78i shows a schedule having identified potential problems with the calculated schedule. For example, schedule issues folder 143 is expanded and includes general issues folder 144, assignment rule issues folder 156, queue issues folder 159, shift issues folder 161, event issues folder 163, and visualization issues folder 166.

The general issues folder 144 can include, for example, problem 146 indicating that only three agents are scheduled on Jul. 4, 2005 at 7:30 am, but that a corresponding minimum quality agents constraint requires 4 agents. Additionally, problem 149 indicates that only two agents are scheduled on Jul. 5, 2005 at 7:00 am, but the minimum quality agents constraint requires 4 agents; problem 151 indicates that only one agent is scheduled on Jul. 7, 2005 at 4:45 pm, but the minimum quality agents constraint requires 2 agents; and problem 153 indicates that no agents are scheduled to work between Jul. 10, 2005 at 3:00 am and Jul. 11, 2005 at 5:00 am.

The visualization issues folder 166 can include, for example: discovery (or pattern) 167 that indicates employees 9 and 10 repeatedly perform poorly half an hour before and after lunch; pattern 168 that indicates employee 1 repeatedly performs poorly from 5:00 am to 9:00 am on the 4$^{th}$ of July and performs very well afterwards; and pattern 169 that indicates employee 7 repeatedly performs poorly from 5:00 am to 7:30 am in the mornings. Patterns 167, 168, 169 can affect the calculated schedule. By providing such patterns, the supervisor can manually change the calculated schedule to improve the performance of the agents. Additionally or alternatively, a schedule can be automatically or semi-automatically calculated using such patterns.

Figure 8A:
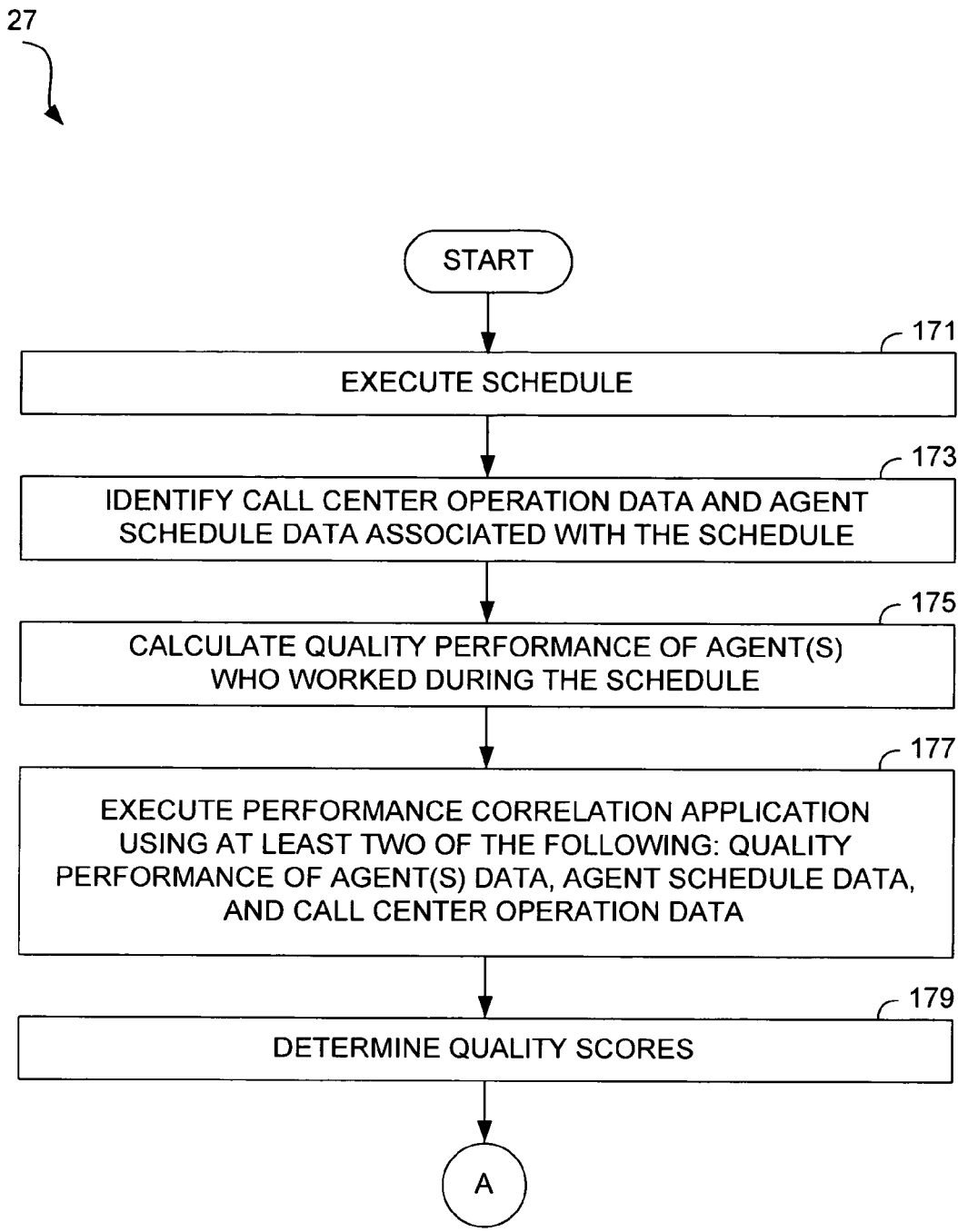
FIGS. 8A-B are flow diagrams that illustrate operation of an embodiment of an agent-manager system, such as shown in FIG. 1, in scheduling call center agents.
Figure 8B:
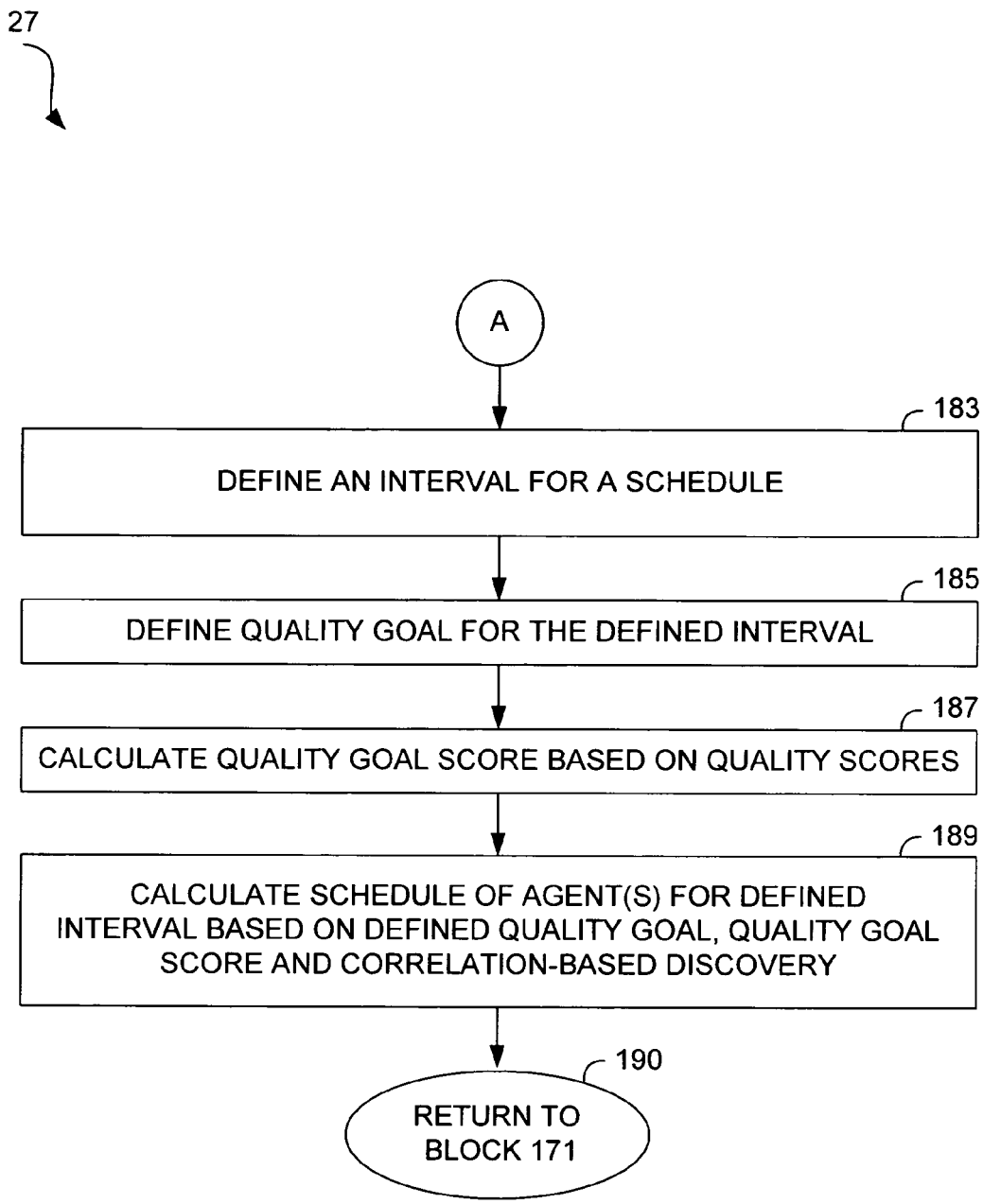

FIGS. 8A-B are flow diagrams that illustrate operation of an embodiment of an agent-manager system, such as shown in FIG. 1, in scheduling call center agents. With the agent-manager system 27, a schedule can be automatically calculated based on the quality goals, quality scores of agents, and correlation-based discovery. Beginning with block 171, a schedule is executed at a call center and in block 173, call center operation data and agent schedule data associated with the schedule are identified. In block 175, quality performance of agents that worked during the scheduled interval is calculated. It should be noted that the identified call center operation data, agent schedule data, and calculated quality performance of agents data are stored in memory 63 and can be accumulated as more schedules are calculated and executed. In block 177, a performance correlation application 70 is executed to correlate at least two of the following stored data: quality performance of agents data, agent schedule data, and call center operation data. The operation of the performance correlation application 70 is further described in relation to FIGS. 9 and 10.

In block 179, the agent-manager system 27 determines quality scores of the agents based on the past working interval. In block 183, an interval is defined for another schedule, and in block 185, a quality goal can be defined for the call center performance. It should be noted that a quality goal can be defined for agents based on the correlation-based discovery calculated by the performance correlation application 70. For example, to assist a supervisor in defining a quality goal (and/or a service goal) of the call center during the Christmas season, the supervisor may access historical patterns on the performance of the call center during the last two Christmas seasons. The performance during the last two Christmas seasons may influence the supervisor as the levels of quality goal and service goal are configured.

In block 187, the quality goal score for each schedule of the agents is calculated based on the quality scores of the agents. In block 189, the schedule is calculated based on the defined quality goal, the calculated quality goal score, and the correlation-based discovery. As mentioned above, the supervisor can manually change the calculated schedule to improve the performance of the agents based on the correlation-base discovery. Additionally or alternatively, a schedule can be automatically or semi-automatically calculated using the correlation-base discovery that relates to the performance of the agents and the scheduled interval. In block 190, the flow diagram returns to block 171 where the schedule is executed.

Figure 9:
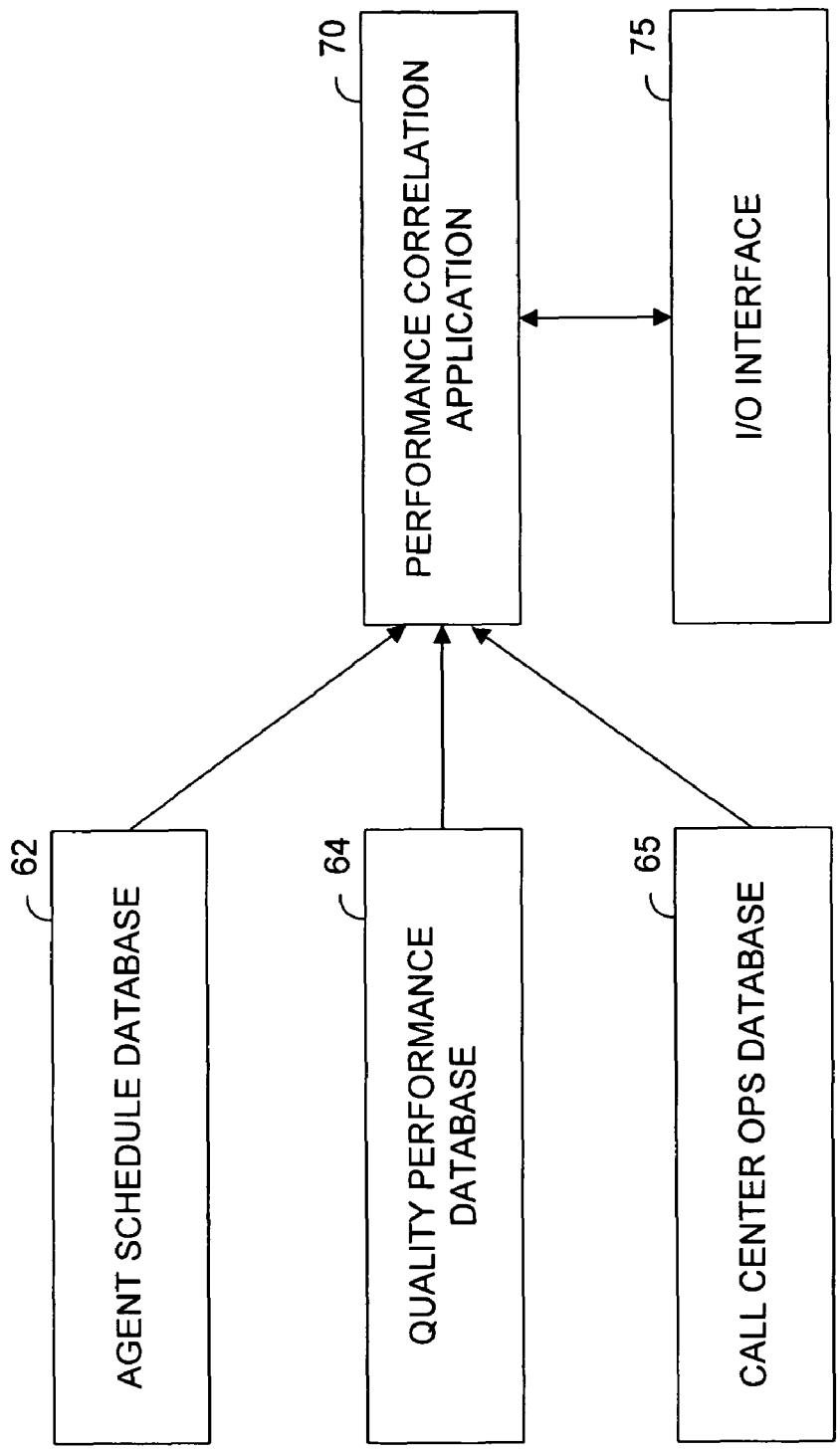
FIG. 9 is a block diagram that illustrates operation of an embodiment of a performance correlation application, such as shown in FIG. 2.

FIG. 9 is a block diagram that illustrates operation of an embodiment of a performance correlation application, such as shown in FIG. 2. Agent schedule database 62 includes, but is not limited to, parameters such as skills, day, date, breaks, meetings, and training. Quality performance database 64 includes, but is not limited to, parameters such as call quality scores and agent name. Call center operation database 65 includes, but is not limited to, parameters such as call identification, call type, agent name, call stats (e.g., time/date percentage of calls answered, average handling times, call volumes, wait times, abandonment rates), and temporal details (e.g., events occurring within a certain time period of each other).

The parameters obtained from the databases 62, 64, 65 are inputted into the performance correlation application 70, which identifies patterns (or correlation-based discovery) that show why and/or when certain poor performance occurs repeatedly and correlated with exogenous events such as high AHT or long queue times. The identified patterns are communicated to the I/O interface, such as display device 76 shown in FIG. 2, or to a manager scheduling application 69 such as shown in FIG. 2. The operation of the performance correlation application 70 involves visualization of contact center performance by way of pre-computed correlations between contact center, agent schedule, and agent performance parameters. The performance correlation application can provide n-way correlations between poor/good quality of agent measurements and other call center details. Thus, the performance correlation application can provide a statistical examination of time-indexed data to find correlations between quality of agents measured historically and other call center details.

Figure 10:
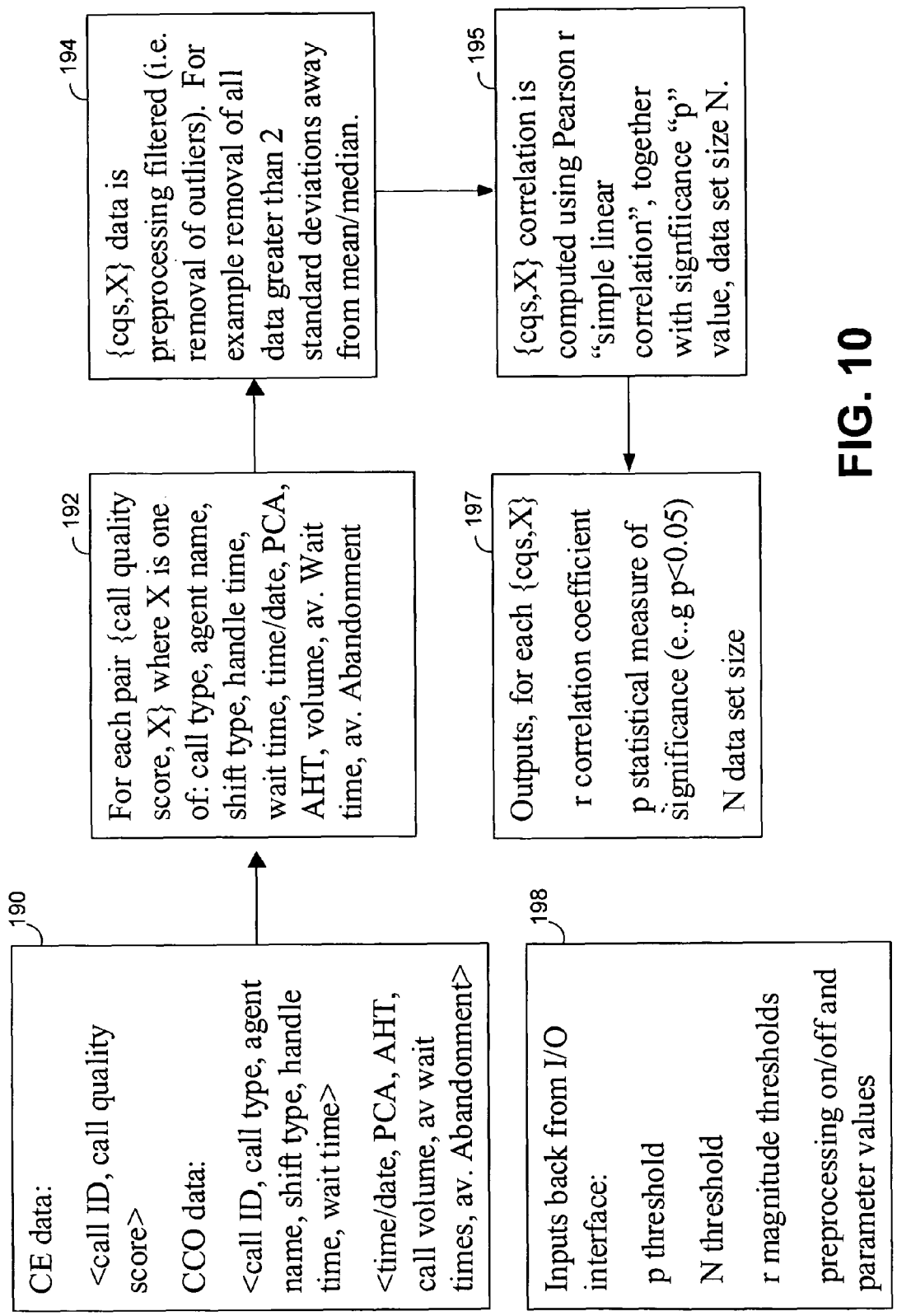
FIG. 10 is a block diagram that illustrates operation of an embodiment of a performance correlation application, such as shown in FIG. 9.

FIG. 10 is a block diagram that illustrates operation of an embodiment of a performance correlation application, such as shown in FIGS. 2 and 9. The performance correlation application 70 identifies statistically valid correlations between quality of agents and other call data. In block 190, parameters from the quality performance database, call contact operation database, and agent schedule database are inputted into the correlation performance application. In block 192, at least two parameters are inputted into the performance correlation application 70 such as a call quality of an agent and other parameters related to the call center and agents. In block 194, the inputted parameters can be pre-process filtered to remove outlier data (for example, removal of all data that is a greater than two standard deviation away from the mean/median). In an alternative embodiment, the pre-processing filtering can allow selective user-induced filtering on other parameters (for example, look only at data relating to a particular agent).

In block 195, the filtered data represents two axes of information, for example, call quality and some second axis (X). This two-axis data is inputted into a Pearson r linear correlation formula, which computes the value of r, known as the correlation coefficient. The correlation coefficient ranges from −1 (perfect negative correlation) to 0 (no correlation) to 1 (perfect positive correlation). In addition, statistical significance p (e.g., $p<0.050$) is computed based on total amount of data used to compute r and based on the probability of the value of r, which is based on random data. This significance value p, the total data set size N, and the correlation coefficient r constitute the outputs of the correlation engine, as shown in block 197. In block 198, a user can adjust the thresholds on desired levels of r magnitude, significance value p, data set size minima N, and other filters such as filtering to a single agent or a set of agents for data to be used in the correlation analyses. In addition, a user can also turn the pre-process filter on or off and input other combinations of paired values.

In some embodiments, the operation of the correlation performance application can be described as a method for taking an exemplary quality of service measurement of a specific call or interval, and mining the exemplar to indicate other call episodes that are statistically correlated in terms of quality of service and in terms of one or more of the set X details with the exemplar. For example, a manager discovers a poor call of Joe's on Wednesday afternoon and requests a correlation between Joe's poor calls across a range of days. Based on the results of the correlation, the manager finds a list of poor calls by Joe on Wednesdays. The list indicates to the manager that Joe does poorly on Wednesdays consistently.

Another correlation computational method is clustering, which takes all evaluated and unevaluated calls and clusters them, or partitions them into sets based on one or more parameters that are statistically correlated with quality of service. A manager can visualize each "cluster" for the user and preferably annotate which calls are evaluated and which are unevaluated. Yet another correlation computational method is statistical trend analysis, which looks for temporal trends in correlated sets of calls to show that quality of service is increasing or decreasing statistically significantly over time.

Figure 11:
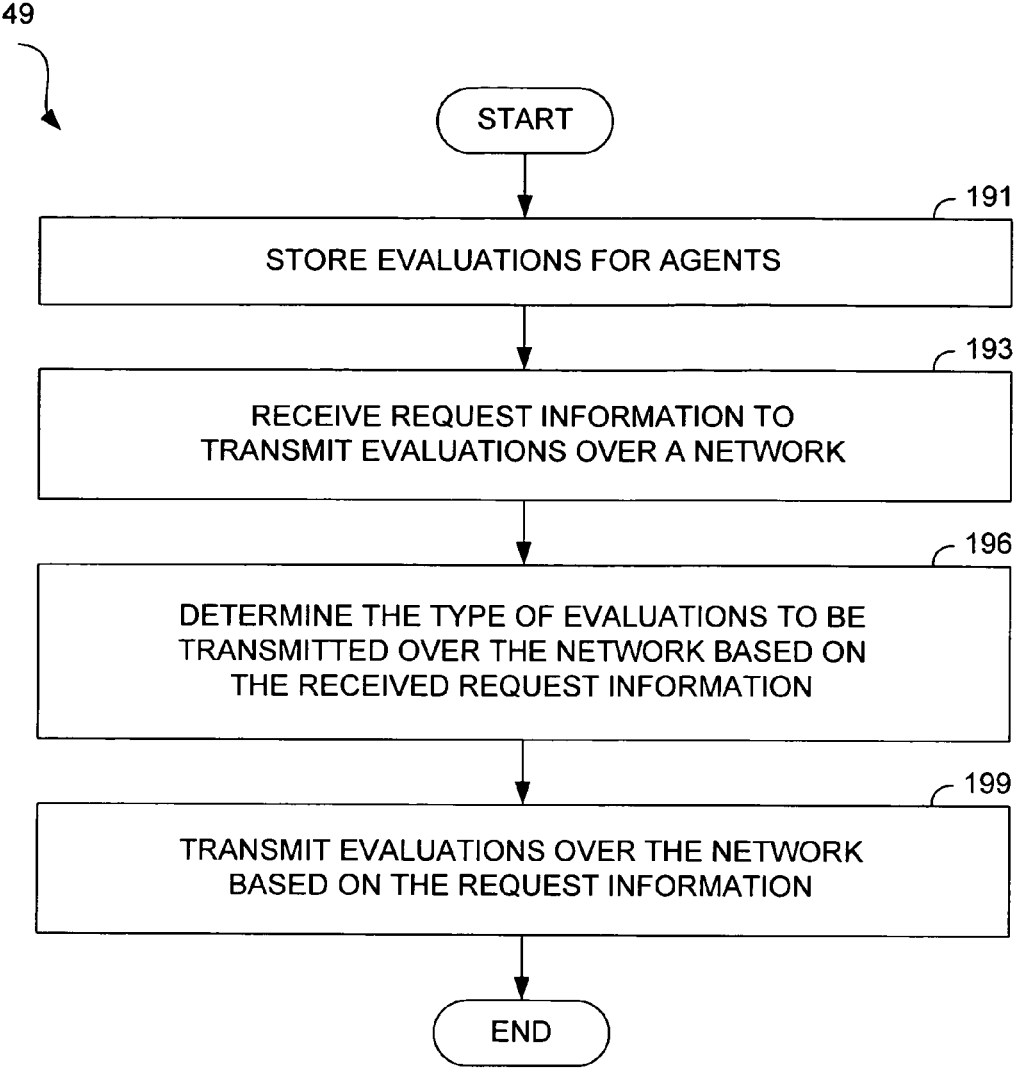
FIG. 11 is a flow diagram that illustrates operation of an embodiment of an agent scheduling application, such as shown in FIG. 2.

FIG. 11 is a flow diagram that illustrates operation of an embodiment of an agent scheduling application, such as shown in FIG. 2. The agent scheduling application 49 stores evaluations for agents, as indicated in block 191, and receives a request for information to transmit evaluations over a network, as indicated in block 193. Based on the requested information, the agent scheduling application 49 determines the type of evaluations to be transmitted over the network, as indicated in block 196. The agent scheduling application 49 transmits the determined evaluations over the network, as indicated in block 199.

Figure 12A:
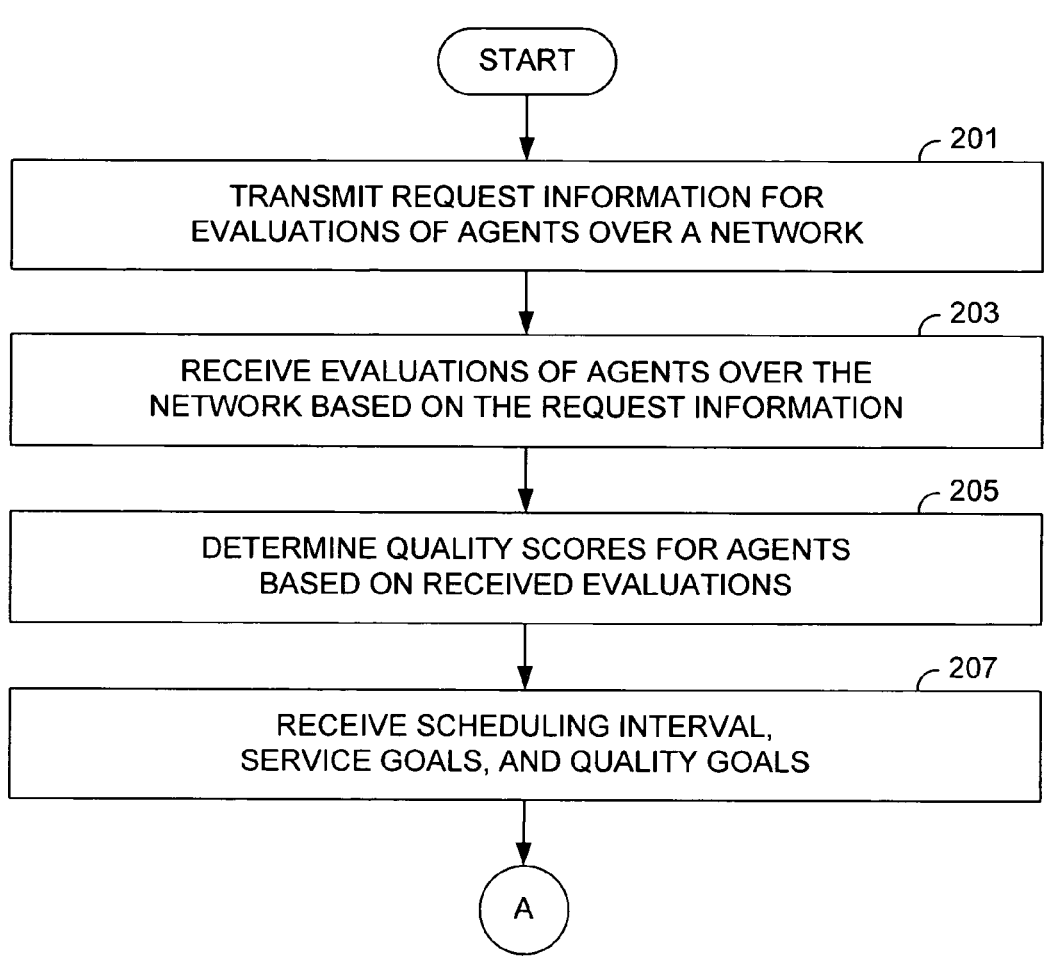
FIGS. 12A-B are flow diagrams that illustrate operation of an embodiment of a manager scheduling application, such as shown in FIG. 2.
Figure 12B:
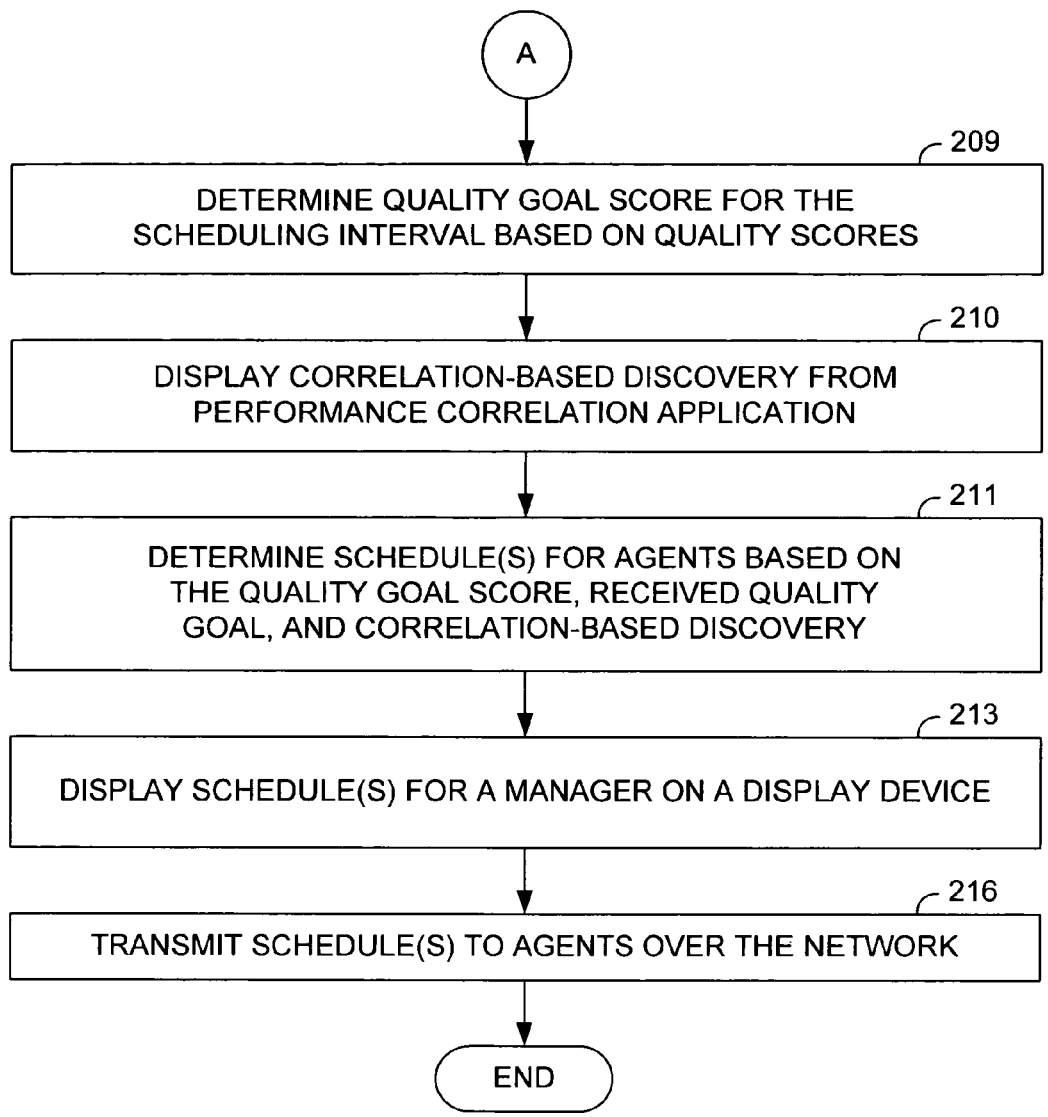

FIGS. 12A-B are flow diagrams that illustrate operation of an embodiment of a manager scheduling application, such as shown in FIG. 2. Beginning with block 201, the manager scheduling application 69 transmits request information for evaluations of agents over a network, and receives evaluations of agents over the network based on the request information, as indicated in block 203. In block 205, quality scores are determined for the agents based on the received evaluations. In block 207, the manager scheduling 69 receives defined intervals for scheduling the agents, defined service goal and defined quality goal.

In block 209, the manager scheduling application 69 determines a quality goal score for the defined interval based on the determined quality scores of the agent. In block 210, correlation-based discovery from the performance correlation application can be displayed so that a user can view and manually change the schedule based on the correlation-based discovery. In an alternative embodiment, the correlation-based discovery is inputted into the manager scheduling application to assist in determining the schedule. One or more schedules are determined for scheduling the agents, as indicated in block 211, based on the quality goal score of the schedules, the received quality goal for the scheduled interval, and the correlation-based discovery. In block 213, the one or more schedules are displayed for the manager on a display device 76. In block 216, the one or more schedules are transmitted to the agent computing device over the network.

Figure 13:
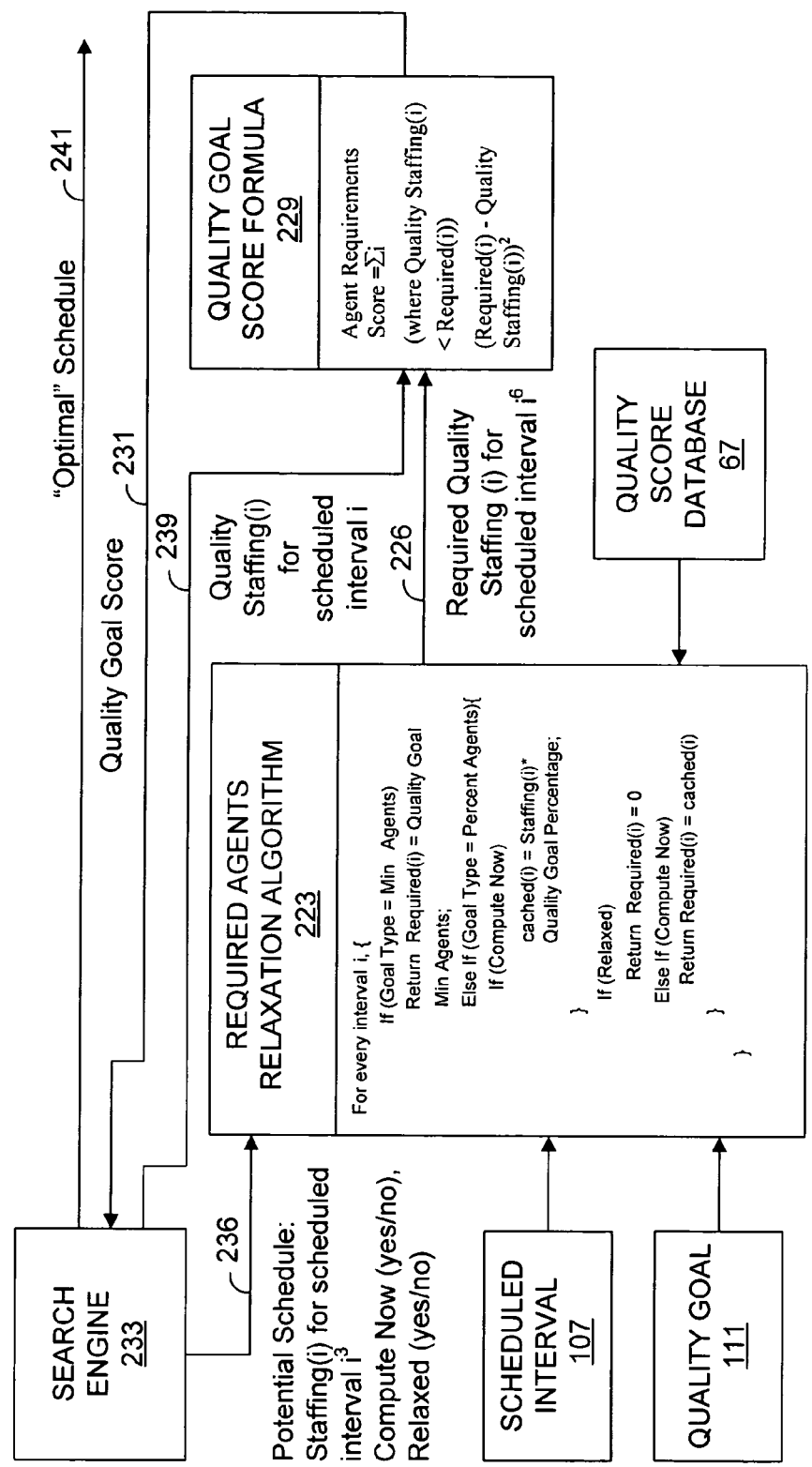
FIG. 13 is a block diagram that illustrates operation of an embodiment of a manager scheduling application, such as shown in FIG. 2.

FIG. 13 is a block diagram that illustrates operation of an embodiment of a manager scheduling application, such as shown in FIG. 2. Scheduled interval 107, quality goal 111, and quality scores from database 67 are inputted into Required Agents Relaxation Algorithm 223, which outputs required quality staffing 226 for a scheduled interval. The Quality Goal Score Formula 229 and the Required Agents Relaxation Algorithm 223 process a quality goal score 231 for each schedule and send the quality goal score to the Search Engine 233. Such Engine 233 is able to generate numerous schedules 236, 239, evaluate each schedule, and then return the best schedule generated 241. In this case, one criterion of a schedule is meeting the quality goal. Each schedule that is generated and evaluated should have such a quality goal score; the schedule with the quality goal score being equal to or greater than the defined quality goal should be returned as the "optimal schedule" 241.

There are two types of quality goals that are handled differently by the manager scheduling application. The first type of quality goals can be referred to as minimum agents with quality. This type of goal specifies that at least X agents are present in every interval with a quality score of at least Y. The second type of quality goal can be referred to as percent agents with quality. This type of goal specified that at least X percent of the scheduled agents in every interval have a quality score of at least Y.

In the scheduled interval, staffing 236 can be computed for every potential schedule by summing the total number of agents skilled and scheduled to be working on a particular queue in that interval. If the agents are skilled to work on multiple queues in the scheduled interval, the agents should be counted as a full agent towards the staffing number on each queue. For example, five agents are skilled and scheduled to work on the customer service queue for the interval of 8:00 am-8:15 am. Seven agents are skilled and scheduled to work on the sales queue. Three agents are skilled and scheduled to work on both the queues. This should result in a total of eight agents and ten agents qualified to be working on the customer service queue and sales queue, respectively.

Next, quality staffing 226 can be computed for the scheduled interval via a similar method. The quality staffing 226 is the total number of agents skilled and scheduled to be working on a particular queue in that interval who have a quality score that is greater than the quality score of at least Y specified in the goal. If the agents are skilled to work on multiple queues in an interval, the agents should be counted as a full agent towards the staffing number on each queue where they meet the quality goal. For example, one of the five agents skilled to work the customer service queue has a quality score of at least 75. Two of the seven agents skilled to work on the sales queue have a quality score of at least 85. Of the three agents skilled to work both queues: one meets the quality score for customer service, and one meets the quality score from sales. This should result in a total of two agents and three agents qualified to be worked on the customer service queue and sales queue, respectively.

Alternatively, a manager may care about a portion of time that agents actually spend on the queue instead of just the number of agents skilled to work that queue. In that case, the staffing 236 and quality staffing 226 can be computed differently. The staffing 236 can be determined as the equivalent amount of dedicated agents needed to provide the same service level as the current collection of multi skilled agents on the queue. The quality staffing 226 can be determined as the sum of the contributions to the queue for each of the agents skilled to work that queue.

The Required Agents Relaxation Algorithm 223 computes the required agents 226 with quality for the scheduled interval. In the case of the minimum agents goal, this calculation simply returns the at least X agents specified in the quality goal. For example, the quality goal for the customer service queue specifies at least three agents with a quality score of 75. Therefore, the required agents should be three for the scheduled interval.

The quality goal Score Formula 229 uses the required quality staffing value 226 and the quality staffing value 239 for each interval to compute the quality goal score 231 that reflects how closely this potential schedule meets the quality goal. If the quality staffing 239 is greater than or equal to the required quality staffing 226, clearly the goal is met. If the quality staffing 239 is less than the required quality staffing 226, there is deviation from the goal.

In the case of the Percent Agents goal, the algorithm can be more complex, such as by using the concept of relaxation and multiple passes to avoid over-constraining the search. Relaxation is a heuristic search technique that employs solving a simplified version of a problem as an intermediate step to solving the complete problem. In this case, early in the search, the quality goal is relaxed so the Required Agents Relaxation Algorithm 223 returns 0. This allows the Search Engine 233 to explore schedules that staff the call center optimally and meet service goals without restricting the Search Engine 233 to evaluating only schedules that meet the quality goal.

Then, at the beginning of a later pass, the Search Engine 233 sets the Required Agents Relaxation Algorithm 223 to compute the required staffing 226. At this point, the algorithm computes the required quality staffing 226 to meet the quality goal and cache it. The Search Engine 233 then instructs the Algorithm 223 to disable relaxation so the cached value should be returned instead of 0. The Search Engine 233 should also set to re-compute the required staffing 226 before each subsequent pass. For example: if there are ten staffing 236 and three quality staffing 239 are scheduled to work on the sales queue for the interval of 8:00 AM-8:15 AM, then the Agents Relaxation Algorithm 223 calculates zero required quality staffing 226. If the quality goal is twenty percent (20%) of staffing, then the required quality staffing is two, which is 20% of ten staffing 236. Once the required agents 226 are computed for the percent agents goal, the values are used by the Quality Goal Score Formula 229 just as in the minimum agents goal method that is stated above.

Finally, the application displays status messages displaying when the goal is met and is not met and displays the staffing for each 15-minute interval that meets the quality goal. This allows the users to validate that their goals are being met by the created schedule.

It should be noted that in the foregoing description, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for visualization of call center performance, comprising the steps of:
   obtaining quality performance of agents data that includes information on a quality of service and quality characteristics of the agent;
   obtaining call center operations data that includes information on statistics and details of a call center;
   discovering a correlation between the quality performance of agents data and the call center operations data, wherein the correlation is computed using one or a combination of the following methods: Pearson linear correlation, clustering computing method, and statistical trend analysis, wherein the computation using Pearson linear correlation outputs correlation coefficient r and statistical measurement p with data set size N; and
   optimizing call center performance based on the correlation.

2. The method of claim 1, wherein the quality performance of agents data further includes call quality scores, agent name, agents identity, call quality score, and call identification, wherein the call center operations data includes call identification, call type, agent name, call statistics, and temporal details, and further comprising obtaining agent schedule data that includes information on shift details and shift-related information of the agents, the agent schedule database further including skill levels, skill types, worked days, worked dates, break times, attended meetings, and training types.

3. The method of claim 1, further comprising:
   obtaining quality scores of agents, the quality scores being a measurement of quality that the agents provide to a call center;
   defining a scheduled interval;
   defining a quality goal for the scheduled interval, the quality goal being a desired measurement of quality that the agents collectively provide to the call center;
   determining a quality goal score for the scheduled interval based on the quality scores of agents; and
   determining a schedule for the agents based on the quality goal, the quality goal score, and the correlation.

4. The method of claim 1, wherein determining the quality goal based on the correlation.

5. The method of claim 1, wherein the step of discovering a correlation includes using a call quality score of agents with X data, where X data is one of the quality performance of agents data and call center operations data.

6. The method of claim 1, further comprising pre-process filtering the quality performance of agents data and call center operations data, wherein filtering the data includes removing the correlated data that have greater than two standard deviations away from mean/median.

7. The method of claim 1, further comprising selective user-induced filtering of the quality performance of agents data and the call center operations data for correlation.

8. A system for visualization of call center performance, comprising:
   a quality performance of agents database including data on a quality of service and quality characteristics of the agent;
   a call center operations database including data on statistics and details of a call center; and
   a performance correlation application that discovers a correlation between the quality performance of agents data and the call center operations data, the performance correlation application optimizing call center performance based on the correlation;
   the performance correlation application configured to correlate using one or a combination of the following methods: Pearson linear correlation, clustering computing method, and statistical trend analysis, wherein the computation using Pearson linear correlation outputs correlation coefficient r and statistical measurement p with data set size N.

9. The system of claim 8, wherein the quality performance of agents data further includes call quality scores, agent name, agents identity, call quality score, and call identification, wherein the call center operations data includes call identification, call type, agent name, call statistics, and temporal details, and further comprising agent schedule database that includes data on shift details and shift-related information of the agents, the agent schedule database further including skill levels, skill types, worked days, worked dates, break times, attended meetings, and training types.

10. The system of claim 8, further comprising an agent scheduling application that is capable of receiving quality scores of agents, the quality scores being a measurement of quality that the agents provide to a call center, the agent scheduling application transmitting the quality scores of agents over a network; and
 a manager scheduling application that is operative to:
  receiving the quality scores of agents;
  receiving a scheduled interval;
  receiving a quality goal for the scheduled interval, the quality goal being a desired measurement of quality that the agents collectively provide to the call center;
  determining a quality goal score for the scheduled interval based on the received quality scores of agents; and
  determining a schedule for the agents based on the quality goal, the quality goal score, and the correlation.

11. The system of claim 10, wherein the manager scheduling application determines the quality goal based on the correlation.

12. The system of claim 8, wherein the performance correlation application correlates data using a call quality score of agents with X data, where X data is one of the quality performance of agents data and call center operations data.

13. The system of claim 8, the performance correlation application is capable of pre-process filtering the quality performance of agents data and call center operations data, wherein filtering the data includes removing the correlated data that have greater than two standard deviations away from mean/median.

14. The method of claim 8, further comprising a selective user-induced filter that provides at least parameters from the quality performance of agents data and the call center operations data for correlation.

15. A system for visualization of call center performance, comprising the steps of:
 means for obtaining quality performance of agents data that includes information on quality of service and quality characteristics of the agent;
 means for obtaining call center operations data that includes information on statistics and details of a call center;
 means for discovering a correlation between the quality performance of agents data and the call center operations data by correlating using one or a combination of the following methods: Pearson linear correlation, clustering computing method, and statistical trend analysis, wherein the computation using Pearson linear correlation outputs correlation coefficient r and statistical measurement p with data set size N; and
 means for optimizing call center performance based on the correlation.

16. The system of claim 15, wherein the quality performance of agents data further includes call quality scores, agent name, agents identity, call quality score, and call identification, wherein the call center operations data includes call identification, call type, agent name, call statistics, and temporal details, and further comprising means for obtaining agent schedule data that includes information on shift details and shift-related information of the agents, the agent schedule data further including skill levels, skill types, worked days, worked dates, break times, attended meetings, and training types.

17. The system of claim 15, further comprising:
 means for obtaining quality scores of agents, the quality scores being a measurement of quality that the agents provides to a call center;
 means for defining a scheduled interval;
 means for defining a quality goal for the scheduled interval, the quality goal being a desired measurement of quality that the agents collectively provide to the call center;
 means for determining a quality goal score for the scheduled interval based on the quality scores of agents; and
 means for determining a schedule for the agents based on the quality goal, the quality goal score, and the correlation.

18. The method of claim 17, wherein means for determining the quality goal is based on the correlation.

* * * * *